(12) United States Patent
Umeda et al.

(10) Patent No.: US 7,555,281 B2
(45) Date of Patent: Jun. 30, 2009

(54) RF RECEIVING APPARATUS

(75) Inventors: Takashi Umeda, Shiga (JP); Atsuhito Terao, Gifu (JP); Motoyoshi Kitagawa, Gifu (JP)

(73) Assignee: Panasonic Corporation, Osaka (JP)

( * ) Notice: Subject to any disclaimer, the term of this patent is extended or adjusted under 35 U.S.C. 154(b) by 477 days.

(21) Appl. No.: 11/520,367

(22) Filed: Sep. 13, 2006

(65) Prior Publication Data
US 2007/0060094 A1 Mar. 15, 2007

(30) Foreign Application Priority Data
Sep. 14, 2005 (JP) ............................. 2005-266537

(51) Int. Cl.
*H04B 1/10* (2006.01)
*H04B 1/18* (2006.01)

(52) U.S. Cl. ...................... 455/313; 455/285; 455/296; 455/302; 455/318; 375/346

(58) Field of Classification Search ................. 455/263, 455/285, 295, 296, 302, 313–319, 323–326; 375/346
See application file for complete search history.

(56) References Cited

U.S. PATENT DOCUMENTS

| | | | |
|---|---|---|---|
| 6,459,889 B1* | 10/2002 | Ruelke | 455/296 |
| 6,498,929 B1* | 12/2002 | Tsurumi et al. | 455/296 |
| 7,136,431 B2* | 11/2006 | Shi et al. | 375/319 |
| 7,260,373 B2* | 8/2007 | Akamine et al. | 455/234.1 |
| 2002/0123319 A1* | 9/2002 | Peterzell | 455/296 |
| 2003/0045263 A1* | 3/2003 | Wakayama et al. | 455/323 |

FOREIGN PATENT DOCUMENTS

| | | |
|---|---|---|
| JP | 2003-134183 A | 5/2003 |
| WO | WO 02/45283 A2 | 6/2002 |

OTHER PUBLICATIONS

European Search Report for Application No. 06 12 0580 dated Sep. 24, 2007.

* cited by examiner

*Primary Examiner*—Simon D Nguyen
(74) *Attorney, Agent, or Firm*—RatnerPrestia (57) ABSTRACT

A level comparator supplied with oscillation signal of local oscillator for comparing the signal level of oscillation signal with a certain predetermined threshold value, and a driving section interposed between the output of level comparator and a control section are provided. When the level comparator recognized that the signal level exceeded the threshold value, it puts the driving section into operation for bringing the control section into action.

17 Claims, 4 Drawing Sheets

RF RECEIVING APPARATUS

FIELD OF THE INVENTION

The present invention relates to a direct conversion system RF receiving apparatus used in a battery-operated portable television receiver and the like equipment.

BACKGROUND OF THE INVENTION

Direct conversion system has been attracting a keen attention as the receiving system for use in a portable RF receiving apparatus. Japanese Patent Unexamined Publication No. 2003-134183 discloses a direct conversion system receiving apparatus suitable to low-voltage power supply.

Figure 4:
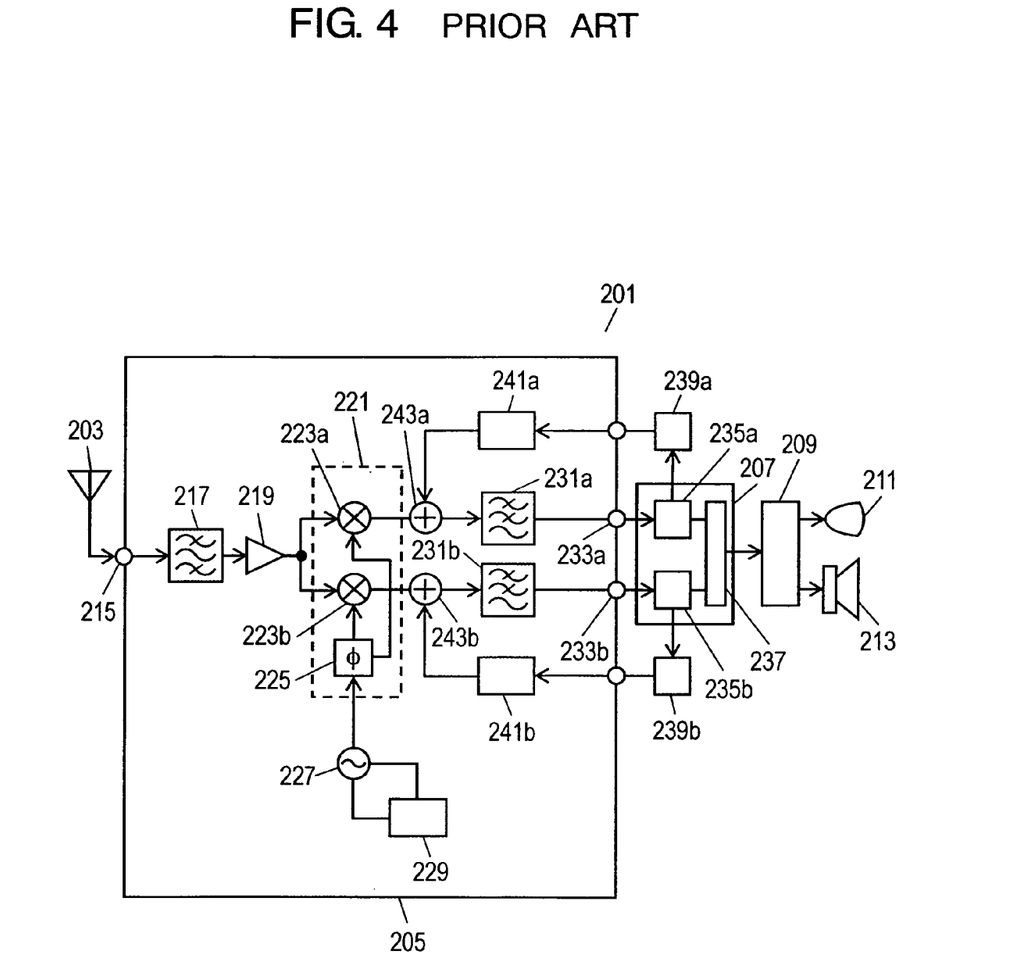
FIG. 4 A block diagram showing the circuit structure of a conventional RF receiving apparatus.

A conventional portable television receiver which employs the above direct conversion receiving system is described in the following referring to the drawing. FIG. 4 is a block diagram of RF receiving apparatus 201 used in a conventional portable television receiver. As shown in FIG. 4, conventional RF receiving apparatus 201 includes antenna 203, electronic tuner 205 for tuning in a desired channel among the signals received by antenna 203, demodulation unit 207 for demodulating I and Q signals outputted from electronic tuner 205, decoder 209 for decoding those signals demodulated at demodulation unit 207, and display 211 and speaker 213 to which the outputs of decoder 209 are supplied.

RF signals incoming to antenna 203 are led to input terminal 215 of portable television receiver 201's electronic tuner 205. Bandpass filter 217 allows only receiving band frequency to pass through, among those signals inputted to input terminal 215. Those passed through bandpass filter 217 are amplified by amplifier 219 to a certain specific signal level, and delivered to mixing circuit 221 of direct conversion system.

Mixing circuit 221 is formed of mixer 223a, mixer 223b and phase shifter 225. Each of mixers 223a and 223b is supplied at its one input with the output of amplifier 219, while at its another input with the oscillation signal of local oscillator 227 via phase shifter 225. Mixing circuit 221 mixes amplifier 219's output signal and local oscillator 227's oscillation signal together, and converts the RF signal direct into I and Q signals whose phases are different to each other by 90 degrees. Local oscillator 227 is connected with PLL circuit 229 to form a loop.

Each of the I and Q signals is delivered to output terminal 233a, output terminal 233b, respectively, via low pass filter 231a, low pass filter 231b. The I and Q signals outputted from electronic tuner 205 are delivered to demodulation unit 207. Demodulation unit 207 is formed of A/D converters 235a and 235b supplied with the I and Q signals, respectively, and demodulator 237.

Since it is easy to integrate the above circuit of direct conversion system into an IC device, the direct conversion system circuit is suitable for use in portable television receiver 201 or the like apparatus where the easy-to-carry is the essential property. However, the direct conversion system has a disadvantage that the quality of receiving is deteriorated by a distortion of receiving signal due to DC offset voltage caused at mixing circuit 221.

As a countermeasure, the direct conversion system receiving circuit is provided with a control loop for suppressing the DC offset voltage. In the control loop, outputs of A/D converters 235a and 235b are delivered to detectors 239a and 239b, respectively. Detectors 239a and 239b detect DC offset voltage. Outputs of detectors 239a and 239b are supplied to control sections 241a and 241b, respectively, and the control sections generate cancellation signal for canceling the detected DC offset voltage.

Composers 243a and 243b are provided, respectively, between mixers 223a, 223b and low pass filters 231a, 231b. Composers 243a and 243b are supplied with the cancellation signal, and the DC offset voltage is cancelled.

Low power consumption is an essential requirement for RF receiving apparatus 201 used in a battery-operated portable television receiver or the like equipment. In the conventional RF receiving apparatus 201, however, control sections 241a and 241b always watch the signals outputted from detectors 239a and 239b, and generate the cancellation signal to be supplied to composers 243a and 243b. Thus, the control loop is always in the operating state and consumes a substantial power for the purpose.

SUMMARY OF THE INVENTION

RF receiving apparatus in the present invention includes an input terminal; a mixing circuit of direct conversion system which is supplied at its one input with RF signal incoming to the input terminal while at its another input with an oscillation signal of a local oscillator, and outputs a plurality of output signals whose phases are different to each other; a suppression part supplied with the output of mixing circuit; an output terminal supplied with the output of suppression part; a detector for detecting DC offset voltage contained in the output signal of mixing circuit; and a control section disposed between the output of detector and the input of suppression part. If the detector detected a DC offset voltage, the control section outputs a signal to the suppression part to have the DC offset voltage suppressed. In this RF receiving apparatus, a level comparator which is supplied with the oscillation signal and compares signal level of the oscillation signal with a certain predetermined threshold value, and a driving section which is inserted between the output of level comparator and the control section are provided interposing between the local oscillator and the mixer. When the level comparator recognized that the signal level exceeded threshold value, it puts the driving section into operation for bringing the control section into action.

In the above-described configuration, the control section is put into action at the time when the level comparator recognized that a signal level exceeded threshold value. This brings about an advantage of reduced consumption of the power.

Furthermore, since the level comparator detects a signal level of oscillation signal which shifts sensitively corresponding to a temperature change, it can effectively suppress generation of DC offset voltage caused by a temperature change, among other factors.

DETAILED DESCRIPTION OF PREFERRED EMBODIMENTS

First Embodiment

Figure 1:
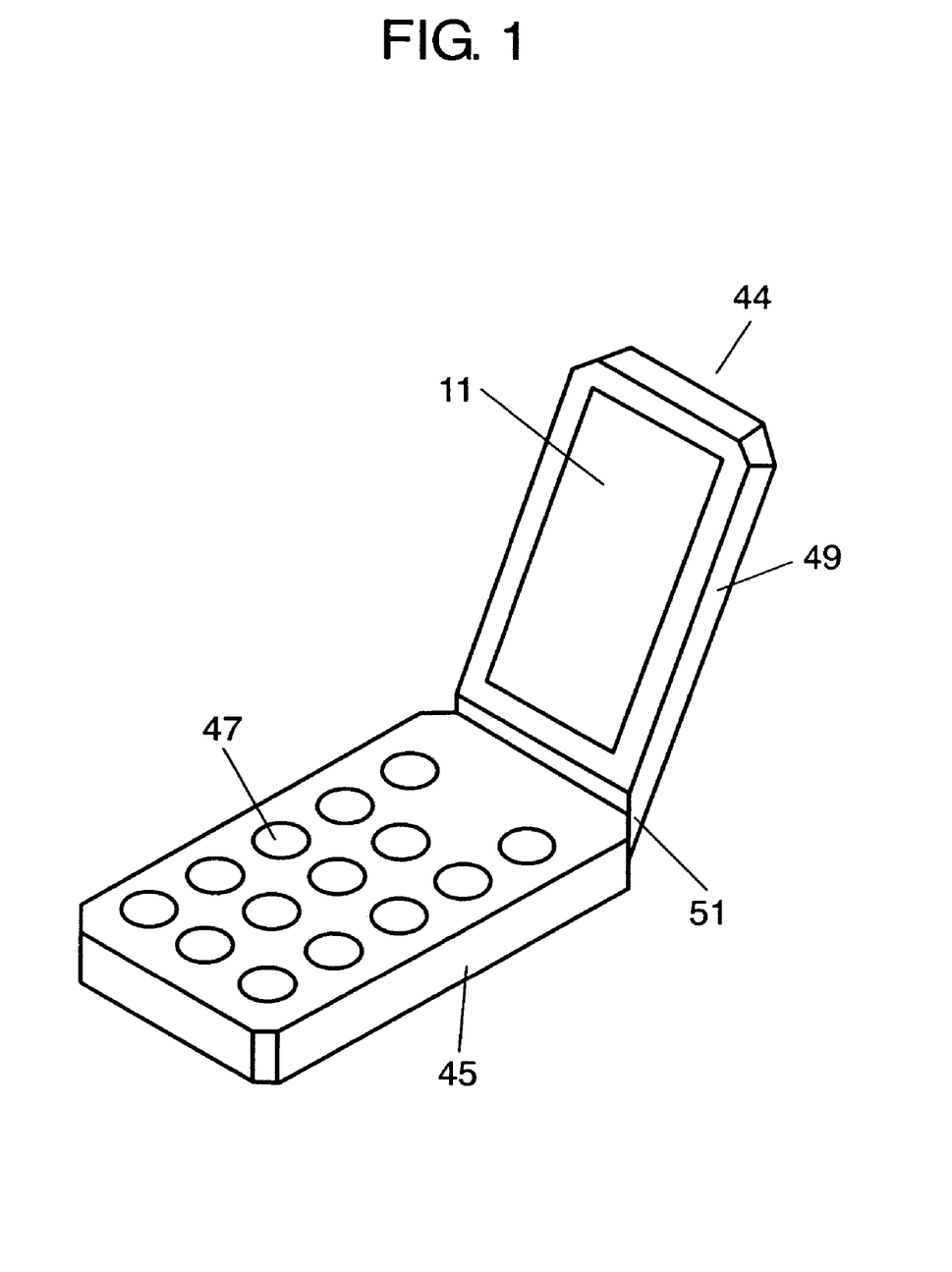
FIG. 1 A perspective view showing the appearance of portable television receiver in accordance with a first exemplary embodiment of the present invention.

A RF receiving apparatus in accordance with a first exemplary embodiment of the present invention is described referring to the drawings. FIG. 1 is a perspective view of portable television receiver 44 in the first embodiment. As shown in FIG. 1, there are input keys 47 provided on main body 45 of portable television receiver 44 for turning the power supply ON/OFF and selecting a desired channel. Display portion 49 is equipped with liquid crystal display panel 11. Main body 45 and display portion 49 are coupled together by means of hinge 51. The RF receiving apparatus in the present embodiment is housed in main body 45 and powered by a battery of portable television receiver 44 for displaying a received television channel on display panel 11.

Figure 2:
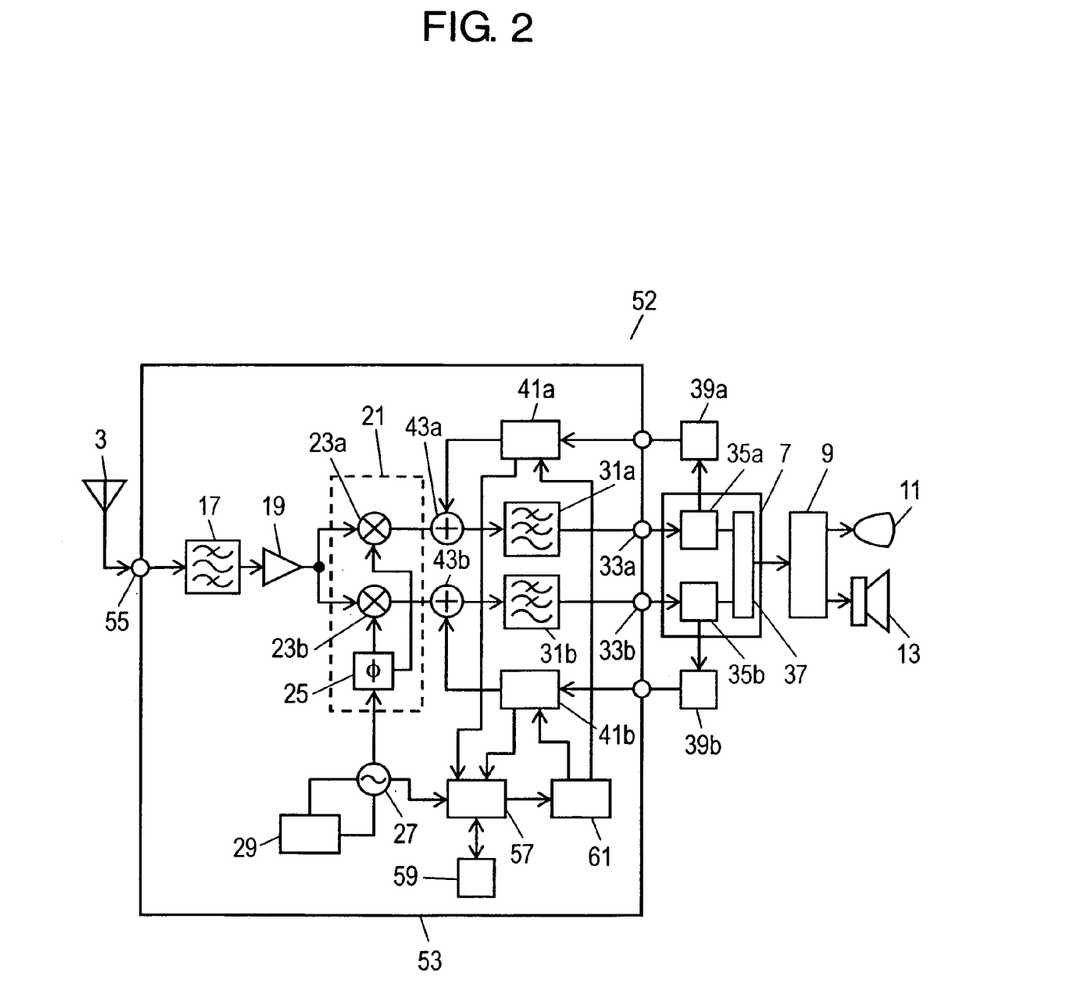
FIG. 2 A block diagram showing the circuit structure of RF receiving apparatus in the first second embodiment.

The RF receiving apparatus in the present embodiment is described referring to the drawings. FIG. 2 is a block diagram showing the circuit structure of the RF receiving apparatus.

In RF receiving apparatus 52 of FIG. 2, those RF signals incoming to antenna 3 are received by electronic tuner 53. A signal selected at electronic tuner 53 is delivered to demodulation unit 7 for demodulation. The demodulated signal is led via decoder 9 to display panel 11 and speaker 13 to be outputted in the form of visual images and audio sounds. The RF signal here in the present first embodiment refers to a so-called digital television broadcasting after digital-modulation, ranging from channel 1 of approximately 90 MHz to channel 62 of approximately 770 MHz.

Now, electronic tuner 53 is described further in detail. Broadcasting signals arriving at electronic tuner 53's input terminal 55 proceed to bandpass filter 17 for elimination of unnecessary frequencies. The output of bandpass filter 17 is led to amplifier 19. In such portable equipment like this, which is an integration of portable television receiver 44 and a portable telephone unit, it is important that unnecessary frequencies are attenuated sufficiently at bandpass filter 17. Namely, occurrence of a possible distortion at amplifier 19 and mixers 23a, 23b connected after amplifier 19 can be avoided if portable telephone's carrier signal, whose signal level is very substantial relative to that of broadcasting signal, is removed at bandpass filter 17.

Output of amplifier 19 is supplied to mixing circuit 21, which includes mixer 23a, mixer 23b and phase shifter 25. Each of mixers 23a and 23b is supplied at its one input with output from amplifier 19, and at its another input with oscillation signal of local oscillator 27 via phase shifter 25. Thereby, mixing circuit 21 mixes the signal from amplifier 19 and the oscillation signal from local oscillator 27, and converts it direct into I and Q signals whose phases are different to each other by 90 degrees. For this purpose, phase shifter 25 supplies mixers 23a and 23b with signals whose phases are different to each other by 90 degrees. Local oscillator 27 is connected with PLL circuit 29 to form a loop.

Each of the I and Q signals is outputted through output terminal 33a and output terminal 33b, respectively, via low pass filter 31a and low pass filter 31b. The I and Q signals outputted from electronic tuner 53 are supplied to demodulation unit 7. Demodulation unit 7 is consisting of A/D converter 35a, A/D converter 35b, receiving the I and Q signals respectively, and demodulator 37 disposed between the outputs of A/D converters 35a, 35b and decoder 9.

Since the above-described circuit of direct conversion system can be readily integrated into an IC device, it is suitable for use in a portable television receiver and the like equipment with which the easy-to-carry is an essential property. However, the direct conversion system has a disadvantage that DC offset voltage generated at mixing circuit 21 causes a distortion with receiving signal, which deteriorates the quality of reception.

So, the direct conversion system receiving circuit is provided with a control loop for suppressing DC offset voltage. In the control loop, each of the outputs of A/D converter 35a and A/D converter 35b is inputted to detector 39a and detector 39b, respectively, and DC offset voltage is detected using a signal converted into the digital at A/D converter 35a and A/D converter 35b. Each of the outputs of detector 39a and detector 39b is supplied to control section 41a and control section 41b, respectively, and control section 41a and control section 41b generate cancellation signal for canceling the detected DC offset voltage.

In the present first embodiment, composer 43a and composer 43b, or the suppression part, are provided between mixers 23a, 23b and low pass filters 31a, 31b, respectively. By supplying these composers 43a, 43b with the cancellation signal, the cancellation signal and each of the outputs from mixers 23a, 23b can be composed together. In this way, DC offset voltage and cancellation signal are composed together at composer 43a and composer 43b, and the DC offset voltage is suppressed. These composers 43a and 43b can cancel DC offset voltage, in so far as they are disposed at a point in an upstream region before A/D converters 35a and 35b; viz. a point before the converters' input terminals at the mixing circuit 21 side.

Level comparator 57 and driving section 61 connected with the output of level comparator 57 are inserted between the output of local oscillator 27 and control sections 41a and 41b. Level comparator 57 is coupled with memory 59 for storing threshold value; namely, the bottom limit value and the upper limit value that is the bottom limit value plus a certain specific voltage value. Level comparator 57 compares signal level of an oscillation signal delivered from local oscillator 27 with the threshold value stored in memory 59. The outputs of control sections 41a and 41b are connected to level comparator 57.

The engineers engaged in the proposed technology under discussion conducted a study about what causes the shift with DC offset voltage in the above RF receiving apparatus 52. As the result of study, it has been found out that the DC offset voltage in a direct conversion system such as the one in the present embodiment is generated by a self mixing at mixers 23a and 23b, and a difference in the characteristics among the pairs of transistors, or resistors, used in the equilibrium circuit of mixer 23a and mixer 23b. the engineers further confirmed that the DC offset voltage shift is readily caused by a temperature change.

Based on the finding that signal level of local oscillator 27's oscillation signal shifts corresponding to temperature, the engineers perceived a concept with which a temperature change is detected through detection of oscillation signal's signal level. Namely, they made a feasibility study on a structure in which level comparator 57 detects an oscillation signal's signal level, and puts a control loop into operation for suppressing DC offset only when level comparator 57 judged that the signal level shifted. In the above-described configuration, when an oscillation signal's signal level is recognized to have shifted, it is assumed that temperature has changed and the DC offset voltage also changed, and the control loop is put into operation. In so far as the temperature shift is within a range of threshold values, control section 41a and control section 41b stay in OFF state. So, RF receiving apparatus 52 consumes lower power. Although control sections 41a and 41b alone were retained in OFF state in the present embodiment, detectors 39a and 39b may of course be retained in OFF state in addition to the control sections. In this case, the power consumption can be lowered a step further.

Now in the following, the operation of suppressing DC offset voltage in RF receiving apparatus 52 is described in detail. Level comparator 57 detects an oscillation signal's signal level delivered from local oscillator 27, and then compares the signal level with the threshold value stored in memory 59. Memory 59 in the present embodiment stores the upper limit value and the bottom limit value of oscillation signal's signal level as the threshold value. When level comparator 57 recognized either the upper limit value or the bottom limit value is exceeded, a signal is outputted to tell driving section 61 that threshold value was exceeded. Upon receiving the signal, driving section 61 puts control sections 41a and 41b into action.

When level comparator 57 recognized that signal level of an oscillation signal exceeded the upper limit value or the bottom limit value, it modifies the threshold value then stored in memory 59. Describing practically, when level comparator 57 judged that an oscillation signal's signal level has a value greater than the upper limit value, level comparator 57 registers the upper limit value, viz. the value stored in memory 59 at that moment, in memory 59 as new bottom limit value. Level comparator 57 further registers a value, that is the new bottom limit value plus a certain specific voltage value, in memory 59 as new upper limit value.

On the other hand, when level comparator 57 judged that an oscillation signal's signal level is lower than the bottom limit value, level comparator 57 registers the bottom limit value, viz. the value stored in memory 59 at that moment, in memory 59 as new upper limit value. Level comparator 57 further registers a value, that is the new upper limit value minus a certain specific voltage value, in memory 59 as new bottom limit value.

As described in the above, if level comparator 57 recognized that a threshold value was exceeded it modifies the threshold value to a new value. Thus level comparator 57 can detect a temperature change. In the present embodiment, the absolute value of an oscillation signal's signal level is used for the threshold value, and a temperature change can be detected through a change in the absolute value. Therefore, a temperature change can be easily detected even if the level shift of an oscillation signal coming from local oscillator 27 is non-linear to the temperature change. So, a value of an oscillation signal's signal level that corresponds to temperature shift is registered in memory 59 as the threshold value.

When level comparator 57 judged that a threshold value was exceeded, it outputs a signal to driving section 61 instructing to put control sections 41a and 41b into operation. Driving section 61 supplies electric power to control sections 41a and 41b, and bring them into action. The control loop starts operating, and control sections 41a and 41b generate cancellation signal of negative voltage in order to have the detected DC offset voltage cancelled. Composers 43a and 43b, or the suppression part, compose the cancellation signal and the outputs from mixer 23a and mixer 23b together, respectively; thereby the DC offset voltage is suppressed.

After the control loop was put into operation, when control sections 41a, 41b recognized that the DC offset voltage was either 0 or minimum, or in an optimum state, control sections 41a and 41b output an ending signal to level comparator 57 informing that control sections 41a, 41b finished their control operation. Upon receiving the ending signal, level comparator 57 outputs a signal to driving section 61 telling to turn the operation of control sections 41a and 41b into OFF state. Driving section 61 discontinues the power supply to control sections 41a, 41b.

When control sections 41a, 41b recognized that the DC offset voltage was either 0 or minimum, or in an optimum state, control sections 41a and 41b are turned to OFF state by the instruction of level comparator 57. But, the supply of voltage to composers 43a and 43b is continued as it is; composers 43a and 43b keep on receiving it. Thus, the cancellation of DC offset voltage continues.

In the present embodiment, the upper limit value and the bottom limit value stored in memory 59 have been modified to their new values. Instead, a signal level of oscillation signal at the moment when level comparator 57 judged that threshold was exceeded may be registered in memory 59 as signal level reference value, and a fixed margin of certain specific width in the signal level fluctuation in memory 59 for setting fixed upper and bottom limit values of threshold value. In this setup, level comparator 57 detects a signal level difference between an oscillation signal henceforth inputted and the reference value, and compares the difference with the fixed threshold value. An amount of temperature change can be detected in this way.

In a case if level comparator 57 judged that a level difference between an oscillation signal and the reference value exceeded threshold value, the signal level of oscillation signal inputted at the previous operation of control loop is registered in memory 59 as new signal level reference value. In this way, an amount of temperature change after the previous control loop operation can be detected without fail. Thus the control loop can be put into operation more efficiently, and the power consumption can be lowered a step further.

All of those mixing circuit 21, local oscillator 27, PLL circuit 29, composer 43a, composer 43b, low pass filter 31a, low pass filter 31b, control section 41a, control section 41b, level comparator 57 and driving section 61 in the present embodiment can be integrated into a single IC device. This helps implementing a compact RF receiving apparatus 52 in a smaller size.

Composers 43a and 43b in the present embodiment have been disposed between mixers 23a, 23b and low pass filters 31a, 31b, respectively. Instead, these composers 43a and 43b may be disposed between low pass filters 31a, 31b and output terminals 33a, 33b, respectively.

Detectors 39a and 39b in the present embodiment are detecting DC offset voltage from the outputs of A/D converters 35a and 35b. Therefore, control sections 41a and 41b can carry out digital signal processing, which means an easier processing. Furthermore, since it makes use of A/D converters 35a and 35b provided originally for demodulating, there is no need of providing an A/D converter separately.

In the present embodiment, the outputs of A/D converters 35a and 35b have been supplied to detectors 39a and 39b. Instead, detectors 39a and 39b may be supplied with signal derived from any point in the downstream after composers 43a, 43b; namely, a point at the output terminal 33a, 33b side. For example, if signal picked up at a point between composers 43a, 43b and output terminals 33a, 33b is supplied to detectors 39a, 39b, a control loop can be formed within electronic tuner 53. By so doing, detectors 39a and 39b can also be included in an IC device. This helps implementing a still downsized electronic tuner 53.

Second Embodiment

Figure 3:
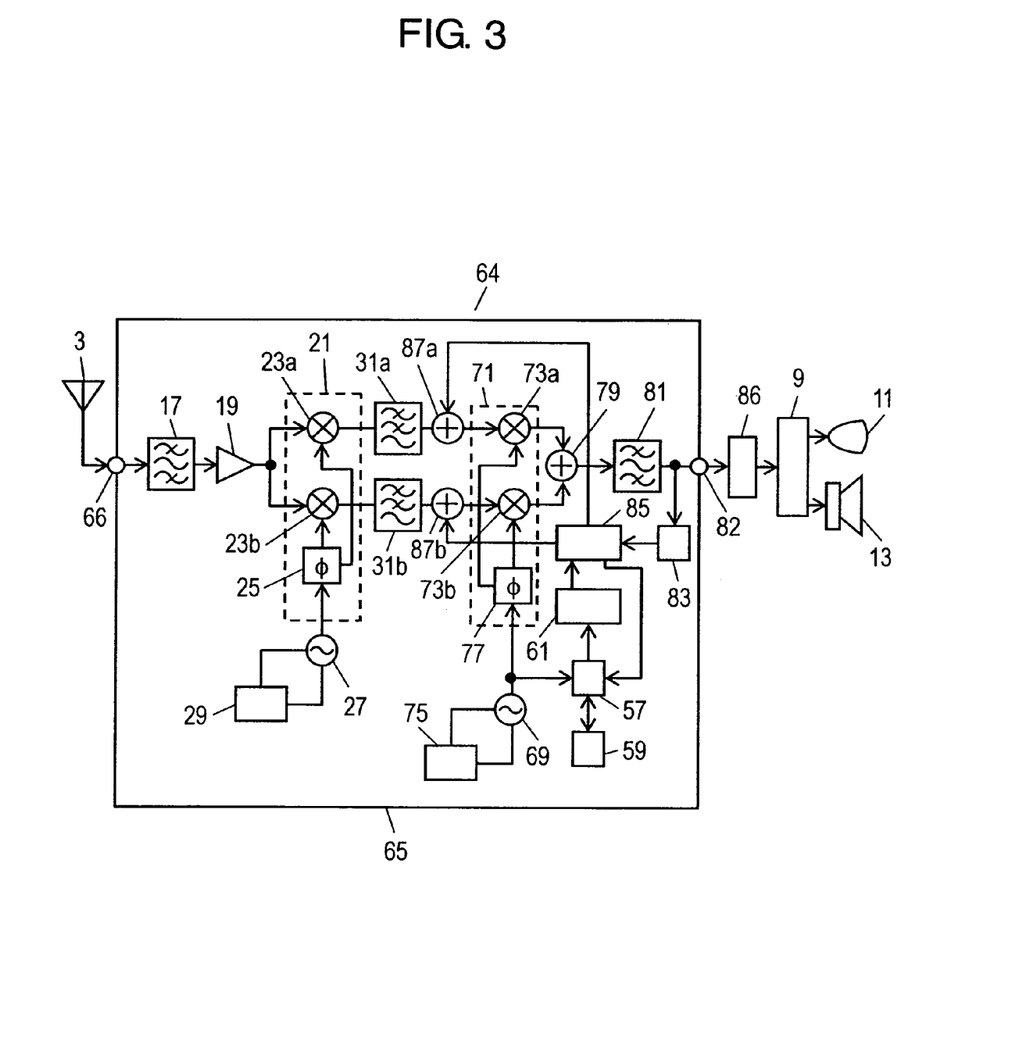
FIG. 3 A block diagram showing the circuit structure of RF receiving apparatus in a second embodiment.

A RF receiving apparatus 64 in a second embodiment is described referring to the drawing. FIG. 3 is a block diagram of circuit showing RF receiving apparatus in the present second embodiment.

Those items in FIG. 3 identical to those of FIG. 2 are designated using the same numerals, and their descriptions have been simplified.

In FIG. 3, RF receiving apparatus 64 of a portable television receiver includes antenna 3, electronic tuner 65 for selecting a desired channel among the signals received by antenna 3, demodulation unit 86 for demodulating a signal of intermediate frequency outputted from electronic tuner 65, decoder 9 for decoding the signal demodulated at demodulation unit 86, and display panel 11 and speaker 13 to which the output of decoder 9 is supplied.

Like in electronic tuner 53, RF signal delivered from antenna 3 is led to mixing circuit 21, which is a first mixing circuit of direct conversion system, via input terminal 66, bandpass filter 17 and amplifier 19, in the above-configured electronic tuner 65. In mixing circuit 21, the RF signal is mixed with an oscillation signal outputted from local oscillator 27, and I and Q signals are taken out directly. Each of the I and Q signals outputted from mixing circuit 21 is supplied to low pass filter 31a and low pass filter 31b, respectively.

RF receiving apparatus 64 in the present second embodiment is provided with mixing circuit 71, or a second mixing circuit supplied at its one input with the output from low pass filters 31a and 31b, respectively, while at its another input with the output of fixed oscillator 69. Fixed oscillator 69 in the present embodiment oscillates a 57 MHz fixed oscillation signal. Mixing circuit 71 mixes the output of fixed oscillator 69 with either I or Q signal, for conversion into 57 MHz IF signal.

Mixing circuit 71 has mixer 73a and mixer 73b, which are supplied with outputs of low pass filters 31a and 31b, respectively. Fixed oscillator 69 is connected with PLL circuit 75 to form a loop. There is phase shifter 77 provided between fixed oscillator 69 and the other inputs of mixers 73a, 73b. Phase shifter 77 shifts phase of oscillation signal outputted from fixed oscillator 69 so that mixers 73a and mixer 73b are supplied with signals whose phases are different to each other by 90 degrees. The outputs of mixer 73a and mixer 73b are supplied to input of composer 79, to have these output signals composed together. A signal composed at composer 79 is outputted to demodulation unit 86 via bandpass filter 81 through output terminal 82.

Namely, RF receiving apparatus 64 in the present second embodiment is a RF receiving apparatus of so-called Weaver method formed of mixing circuit 21, mixing circuit 71 and composer 79. Where, composer 79 receives two IF signals having the same phase, as the input. Then, the phases of image signals are different to each other by 180 degrees; therefore, the image signals are cancelled at composer 79. At mixers 73a and 73b, DC offset voltages outputted from mixers 23a and 23b are mixed with a signal from fixed oscillator 69. Thereby, mixers 73a and 73b output a signal which is IF-converted DC offset voltage (hereinafter referred to as converted DC offset signal).

Bandpass filter 81 is interposed between composer 79 and output terminal 82. Output of bandpass filter 81 is connected also with input of detector 83. Thereby, detector 83 detects converted DC offset signal from among the output signal of mixing circuit 71. The output of detector 83 is led to input of control section 85. The output of control section 85 is supplied to composer 87a, or the suppression part, provided between low pass filter 31a and mixer 73a, and to composer 87b, or the suppression part, provided between low pass filter 31b and mixer 73b.

In order to cancel the converted DC offset signal, control section 85 generates a cancellation signal corresponding to a converted DC offset signal detected by detector 83, which cancellation signal is supplied to composers 87a and 87b. At composers 87a and 87b, the DC offset voltage and respective cancellation signals are composed together; as the result, the DC offset voltage is cancelled.

In the present second embodiment, composer 87a, or the suppression part, has been disposed between low pass filter 31a and mixer 73a; while composer 87b between low pass filter 31b and mixer 73b. Instead, it may be disposed either between low pass filter 31a and mixer 23a and between low pass filter 31b and mixer 23b, or between mixer 73a and composer 79 and between mixer 73b and composer 79.

Furthermore, it is also possible to replace composers 87a, 87b functioning as the suppression part with composer 79. In this case, composers 87a, 87b are not used, but composer 79 is used as the suppression part. Namely, composer 79 is supplied direct with cancellation signal generated at control section 85, and composer 79 composes DC offset voltage generated at mixer 23a, DC offset voltage generated at mixer 23b and cancellation signal altogether at once. In this way, the scale of circuits can be made smaller a step further, meaning a further downsizing.

Level comparator 57, driving section 61 and memory 59 used in the present embodiment remain the same as those used in the first embodiment. Level comparator 57 compares signal level of oscillation signal incoming from the fixed oscillator with threshold value stored in the memory. If it is judged that an input signal level was exceeding the threshold value, a signal is outputted to driving section 61 instructing to operate control section 85.

Thus, a control loop in the present second embodiment can be put into operation in the same way as in the first embodiment. The control loop starts its operation when the temperature changed. This helps implementing a low-power-consuming RF receiving apparatus.

Level comparator 57 in the second embodiment detects a signal level of fixed oscillator 69's oscillation signal, and as soon as it receives a signal from control section 85 informing that the control operation is finished, it gives instruction to driving section 61 to turn control section 85 OFF.

After the control loop was put into operation, if control section 85 judged that the converted DC offset signal was either0or minimum, or in an optimum state, control section 85 outputs an ending signal to level comparator 57 telling that the control operation is finished. Upon receiving the ending signal, level comparator 57 outputs a signal to driving section 61 instructing to turn the operation of control section 85 OFF. Driving section 61 puts control section 85 into OFF state.

When control section 85 judged that converted DC offset voltage was either 0 or minimum, or in an optimum state, control section 85 is put into OFF state by the instruction of level comparator 57. But, the cancellation signal being supplied to composers 87a, 87b, or composer 79, is maintained as before, and supply to composers 87a, 87b, or composer 79, is continued.

Since RF receiving apparatus 64 in the present embodiment adopts the Weaver method, it can suppress an image signal. Furthermore, since level comparator 57 in the present embodiment detects a signal level of oscillation signal supplied from fixed oscillator 69, a signal level shift of oscillation signal caused by frequency of a selected channel hardly occurs. Therefore, the accuracy level of temperature-shift judgment at level comparator 57 can be raised.

Still further, since an input signal to detector 83 is supplied from a point between bandpass filter 81 and output terminal 82, a control loop can be formed within electronic tuner 65. By so doing, detector 83 can also be contained in an IC device, in addition to mixing circuit 21, local oscillators 27 and 69, PLL circuits 29 and 75, composer 79, composers 87a and 87b, low pass filters 31a and 31b, control section 85, level comparator 57 and driving section 61. Thus it provides the way to a further-downsized compact electronic tuner 65.

What is claimed is:

1. A RF receiving apparatus comprising
an input terminal;
a direct conversion system mixing circuit supplied at one input with RF signal inputted to the input terminal while at another input with an oscillation signal of local oscillator, for outputting a plurality of output signals whose phases are different to each other;
a suppression part supplied with the output of the mixing circuit;
an output terminal supplied with the output of suppression part;
a detector for detecting DC offset voltage contained in the output signals of the mixing circuit;
a control section interposed between the output of the detector and the input of the suppression part, wherein the control section outputting a signal to the suppression part for suppressing the DC offset voltage when the detector detected the DC offset voltage;
a level comparator supplied with the oscillation signal for comparing an oscillation signal level with a certain predetermined threshold value; and
a driving section interposed between the output of level comparator and the control section, when the level comparator detects that the signal level exceeded the threshold value, the level comparator signals the driving section to trigger the control section to control the suppression part to suppress the DC offset voltage.

2. The RF receiving apparatus of claim 1, wherein
the level comparator is connected with a memory for storing the upper limit value of threshold value, if the level comparator recognized that the signal level of oscillation signal had a value greater than the upper limit value it registers a value that is the upper limit value plus a certain predetermined value in the memory as new upper limit value.

3. The RF receiving apparatus of claim 2, wherein
the memory stores the bottom limit value of threshold value, if the level comparator recognized that the signal level of oscillation signal had a value that is greater than the upper limit value it registers the upper limit value in the memory as new bottom limit value.

4. The RF receiving apparatus of claim 1, wherein
the level comparator is connected with a memory for storing the bottom limit value of threshold value, if the level comparator recognized that the signal level of oscillation signal had a value smaller than the bottom limit value it registers a value that is the bottom limit value minus a certain predetermined value in the memory as new bottom limit value.

5. The RF receiving apparatus of claim 4, wherein
the memory stores the upper limit value of threshold value, if the level comparator recognized that the signal level of oscillation signal had a value smaller than the bottom limit value it registers the bottom limit value in the memory as new upper limit value.

6. The RF receiving apparatus of claim 1, wherein
the memory connected with the level comparator stores beforehand a threshold value and a signal level reference value, if the level comparator recognized that a difference between an inputted signal level and the signal level reference value exceeded the threshold value it makes the control section to operate the driving section.

7. The RF receiving apparatus of claim 6, wherein
if the level comparator recognized that a difference between the inputted signal level and the signal level reference value exceeded the threshold value it registers the value of inputted signal level in the memory as new signal level reference value.

8. The RF receiving apparatus of claim 1, wherein
the control section generates a cancellation signal of negative voltage for canceling the DC offset voltage, and
the suppression part is consisting of a composer for composing the cancellation signal and the output of mixing circuit together.

9. A RF receiving apparatus comprising
an input terminal;
a first mixing circuit of direct conversion system supplied at one input with RF signal inputted to the input terminal while at another input with an oscillation signal of local oscillator;
a second mixing circuit supplied at the one input with the output of first mixing circuit while at the another input with an output of fixed oscillator;
a composer for composing a plurality of signals outputted from the second mixing circuit together;
an output terminal supplied with the output of composer;
a suppression part provided between the first mixing circuit and the second mixing circuit, or between the second mixing circuit and the composer;
a detector for detecting DC offset voltage contained in the output signal of first mixing circuit;
a control section interposed between the output of the detector and the input of the suppression part, wherein; the control section outputting a signal to the suppression part for suppressing the DC offset voltage when the detector detected the DC offset voltage;
a level comparator supplied with an oscillation signal outputted from either the local oscillator or the fixed oscillator for comparing signal level of the oscillation signal with a certain predetermined threshold value; and
a driving section interposed between the output of level comparator and the control section are provided, when the level comparator recognized that the signal level exceeded the threshold value, the level comparator signals the driving section to trigger the control section to control the suppression part to suppress the DC offset voltage.

10. The RF receiving apparatus of claim 9, wherein
the control section generates cancellation signal having a phase that is different from converted DC offset signal by 180 degrees for canceling the converted DC offset signal which has been converted by the second mixer into intermediate frequency signal,
the composer is supplied with the cancellation signal generated at the control section, and
the suppression part is the composer which composes the cancellation signal and the output of second mixing circuit together.

11. The RF receiving apparatus of claim 9, wherein
the level comparator makes judgment on the signal level of fixed oscillator's oscillation signal.

12. The RF receiving apparatus of claim 9, wherein
the level comparator is connected with a memory for storing the upper limit value of threshold value, if the level comparator recognized that the signal level of oscillation signal had a value greater than the upper limit value it registers a value that is the upper limit value plus a certain predetermined value in the memory as new upper limit value.

13. The RF receiving apparatus of claim 12, wherein
the memory stores the bottom limit value of threshold value, if the level comparator recognized that the signal level of oscillation signal had a value that is greater than the upper limit value it registers the upper limit value in the memory as new bottom limit value.

14. The RF receiving apparatus of claim 9, wherein
the level comparator is connected with a memory for storing the bottom limit value of threshold value, if the level comparator recognized that the signal level of oscillation signal had a value smaller than the bottom limit value it registers a value that is the bottom limit value minus a certain predetermined value in the memory as new bottom limit value.

15. The RF receiving apparatus of claim 14, wherein
the memory stores the upper limit value of threshold value, if the level comparator recognized that the signal level of oscillation signal had a value smaller than the bottom limit value it registers the bottom limit value in the memory as new upper limit value.

16. The RF receiving apparatus of claim 9, wherein
the memory connected with the level comparator stores beforehand a threshold value and a signal level reference value, if the level comparator recognized that a difference between an inputted signal level and the signal level reference value exceeded the threshold value it makes the control section to operate the driving section.

17. The RF receiving apparatus of claim 16, wherein
if the level comparator recognized that a difference between the inputted signal level and the signal level reference value exceeded the threshold value it registers the value of inputted signal level in the memory as new signal level reference value.

* * * * *